United States Patent [19]
Matsumoto et al.

[11] Patent Number: 6,140,477
[45] Date of Patent: Oct. 31, 2000

[54] NEAR-INFRARED RAY ABSORBING POLYAZO COMPOUND

[75] Inventors: Shigekazu Matsumoto; Takao Yanagisawa; Shigehiro Matsumoto; Kunio Shimabukuro, all of Osaka, Japan

[73] Assignee: Hakkol Chemical Co., Ltd., Osaka, Japan

[21] Appl. No.: 09/274,312

[22] Filed: Mar. 23, 1999

[30] Foreign Application Priority Data

Mar. 24, 1998 [JP] Japan .................................. 10-075696

[51] Int. Cl.[7] ....................... C09B 31/068; C09B 31/072; C09B 31/56
[52] U.S. Cl. ........................... 534/653; 534/658; 534/689; 534/754; 534/796; 534/797; 534/763; 534/806; 534/809; 534/810; 534/811; 534/815; 534/829; 534/834
[58] Field of Search ..................................... 534/829, 834, 534/689, 754, 763, 653

[56] References Cited

U.S. PATENT DOCUMENTS 4,977,249  12/1990  Matsumoto et al. .................... 534/696

OTHER PUBLICATIONS

Przybyliski et al., Chemical Abstracts, 102:26364, 1985.

Chemical Abstracts, 64:2199f, 1966.

*Primary Examiner*—Fiona T. Powers
*Attorney, Agent, or Firm*—Sughrue, Mion, Zinn, Macpeak & Seas, PLLC

[57] ABSTRACT

A polyazo compound capable of effectively absorbing near-infrared rays, which can be produced from readily available raw materials is provided, which comprises at least one —OH group or at least one group derived from —OH group at p-position of the azo group in the molecule of the polyazo compound. This compound can be produced by diazotizing a substituted or nonsubstituted aromatic monocyclic or polycyclic compound or heterocyclic compound, each having a diazotizable primary amino group, and successively coupling the resulting diazo component with an azo component having a diazotizable primary amino group, the last azo component being such that —OH group or a group derived from —OH group be present at p-position to the azo group resulting from the azo component.

3 Claims, 3 Drawing Sheets

NEAR-INFRARED RAY ABSORBING POLYAZO COMPOUND

BACKGROUND OF THE INVENTION

1. Fields of the Invention

This invention relates to a polyazo compound capable of absorbing near-infrared rays and more particularly, it is concerned with a near-infrared rays-absorbing polyazo compound having a strong absorption at a near-infrared part, which can be used as a near-infrared absorber for optical recording media, photoconductive materials, light-heat converters, heat ray shielding agents.

2. Description of the Prior Art

Lately, development of techniques relating with near-infrared rays has been been watched with keen interest in the wide technical fields and according to this tendency, development of excellent near-infrared absorbers has also been actively carried out. Thus, a number of proposals have been made to this end.

For example, N, N, N', N',-tetrakis(p-substituted phenyl)-p-phenylene- diamines or benzidines and their aluminum salts or diimonium salts are disclosed in Japanese Patent Publication No. 25335/1968, and compounds of naphthalocyanine type are described in Japanese Patent Laid-Open Publication Nos. 215662/1986 and 154767/1988 and Japanese Patent Publication No. 19693/1989. Furthermore, Japanese Patent Publication No. 31471/1988 discloses that pyrylium salt derivatives are useful as near-infrared ray absorbing dyes, filter dyes or near-infrared ray sensitizing dyes, in particular, as a very effective unsaturated absorber for laser beams.

On the other hand, azo compounds are proposed in Japanese Patent Publication No. 42269/1985 and Japanese Patent Laid-Open Publication No. 159786/1991, but in the former case, there is described metallic complex compounds which meet with problems that they tend to be dissolved in solvents and the metals tend to be released, while in the latter case, they are monoazo compounds in which relatively long chain groups are bonded as alkoxy groups or alkyl groups of alkylamino groups and which are thus hardly available.

However, all the above described known compounds have such complexed molecular structures that expensive raw materials must be used which are hardly available and their production processes are complicated, thus resulting in lowering of yields of the object products.

In addition, in the case of using metallic complex compounds, there arise problems that their solubility in solvents is lower and the metals tend to be released.

SUMMARY OF THE INVENTION

It is an object of the present invention to provide a polyazo compound capable of effectively absorbing near-infrared rays, whereby the problems of the prior art techniques can be solved.

It is another object of the present invention to provide a polyazo compound capable of exhibiting strong absorption for a light of a near-infrared part, which can readily be prepared using available raw materials.

These objects can be attained by a near-infrared ray absorbing polyazo compound comprising at least one —OH group or at least one group derived from —OH group at p-position of the azo group in the molecule of the polyazo compound.

BRIEF DESCRIPTION OF THE DRAWINGS

The accompanying drawings are to illustrate the principle and merits of the present invention in greater detail.

In these figures, the unit of ordinate is "Absorbance (-Log T)", T: transmittance.

DETAILED DESCRIPTION OF THE INVENTION

The inventors have various studies to develop a polyazo compound capable of effectively absorbing near-infrared rays, which can be produced from readily available raw materials and consequently, have reached the present invention.

That is, the present invention provides (1) a near-infrared ray absorbing polyazo compound comprising at least one —OH group or at least one group derived from —OH group at p-position of the azo group in the molecule of the polyazo compound and (2) a process for the production of the polyazo compound as described in (1), comprising diazotizing a substituted or nonsubstituted aromatic monocyclic or polycyclic compound or heterocyclic compound, each having a diazotizable primary amino group, and successively coupling the resulting diazo component with an azo component having a diazotizable primary amino group, the last azo component being such that -OH group or a group derived from —OH group be present at p-position to the azo group resulting from the azo component.

As the group derived from OH group, there are groups of -OR, -OOCR wherein R is $CH_3$, $C_2H_5$, $C_4H_9$, etc. According to the above described production process, the object compound can be produced by procedures known per se.

In the polyazo compound of the present invention, it is important to select an azo component in such a manner that the azo component has at least two azo groups in its molecule and —OH group or a group derived from —OH group is present at p-position to the azo group. That is, when these conditions are satisfied, the polyazo compound exhibits absorption at near-infrared part. This is apparent by comparison of the following three disazo compounds as to the absorption curves of light of the disazo compounds.

(1)

(2)

-continued (3)

Figure 1:
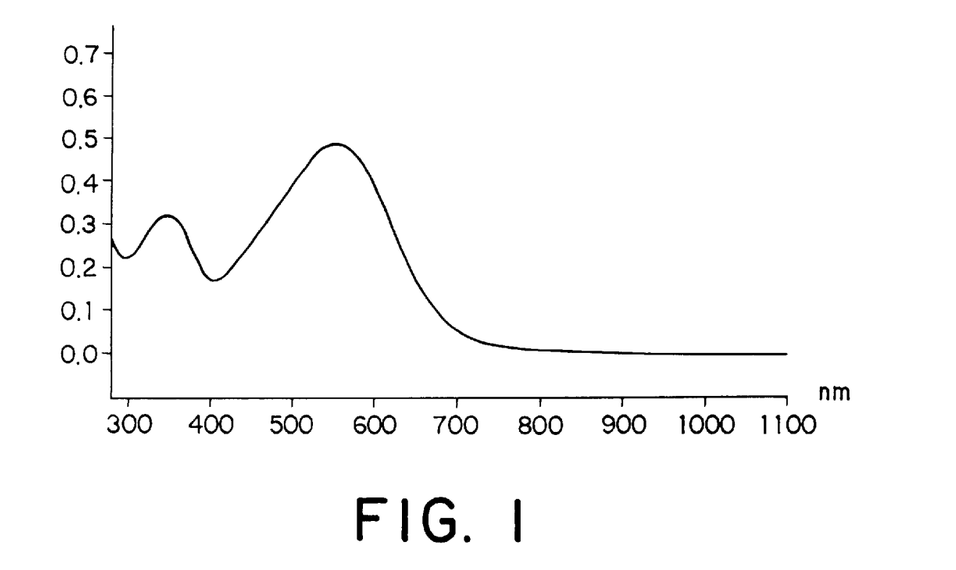
FIG. 1 is a graph showing an absorption curve of a comparative disazo compound (1).
Figure 2:
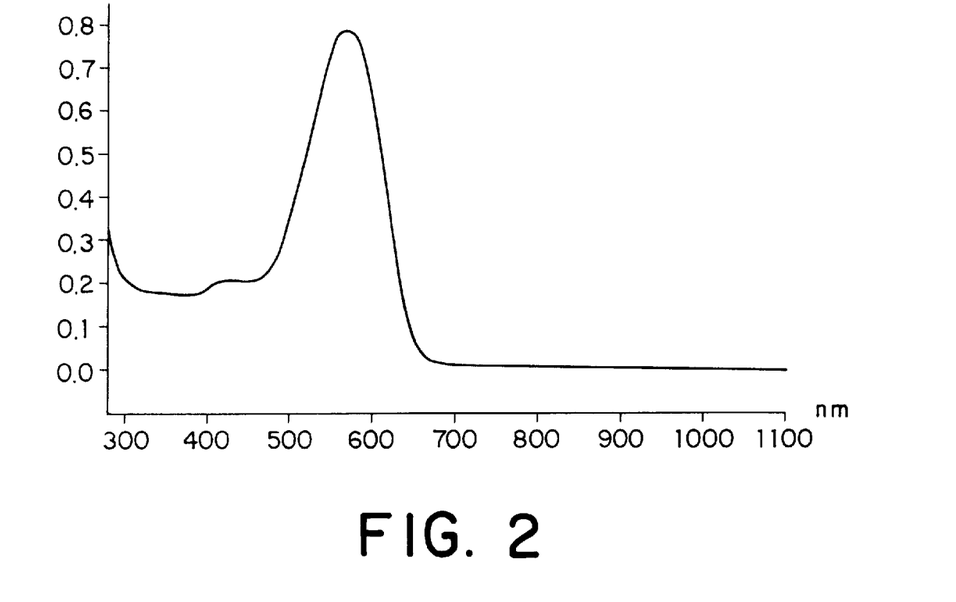
FIG. 2 is a graph showing an absorption curve of a comparative disazo compound (2).
Figure 3:
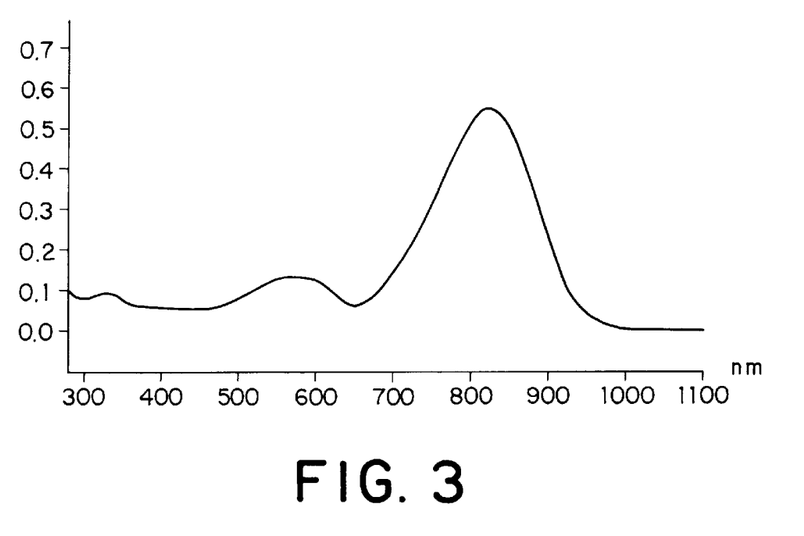
FIG. 3 is a graph showing an absorption curve of a disazo compound (3) of the present invention.

FIG. 1 shows an absorption curve of light of a disazo compound represented by Formula (1), FIG. 2 shows that of Formula (2) and FIG. 3 shows that of Formula (3) (which will hereinafter be referred to respectively as Disazo Compounds (1), (2) and (3)).

As apparent from FIG. 1 to FIG. 3, in the absortion curves of Disazo Compounds (1) and (2), stronger absorptions are found at the visible part (400 to 700 nm), but no absorption is found at the near-infrared part (700 to 1000 nm). On the other hand, in the absortion curve of Disazo Compound (3), absorption can hardly be found at the visible part, while a stronger absorption is instead found at the near-infrared part.

Figure 4:
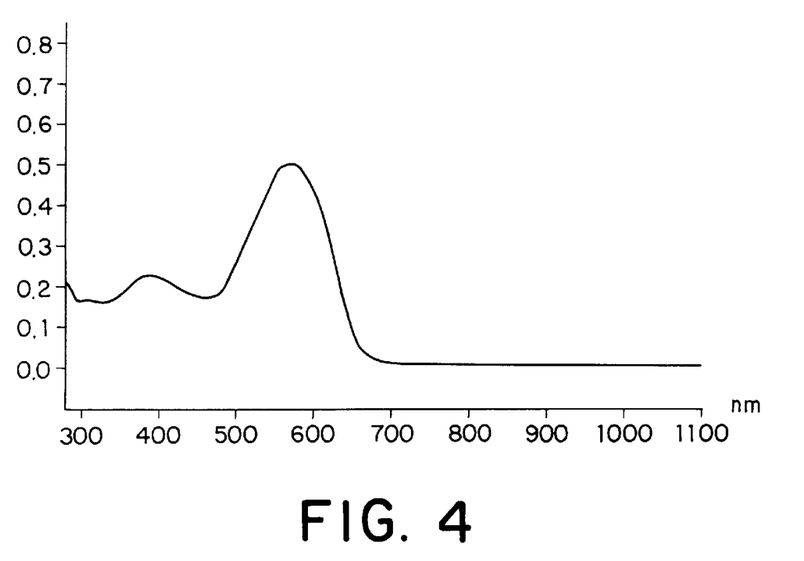
FIG. 4 is a graph showing an absorption curve of a comparative disazo compound (4).
Figure 5:
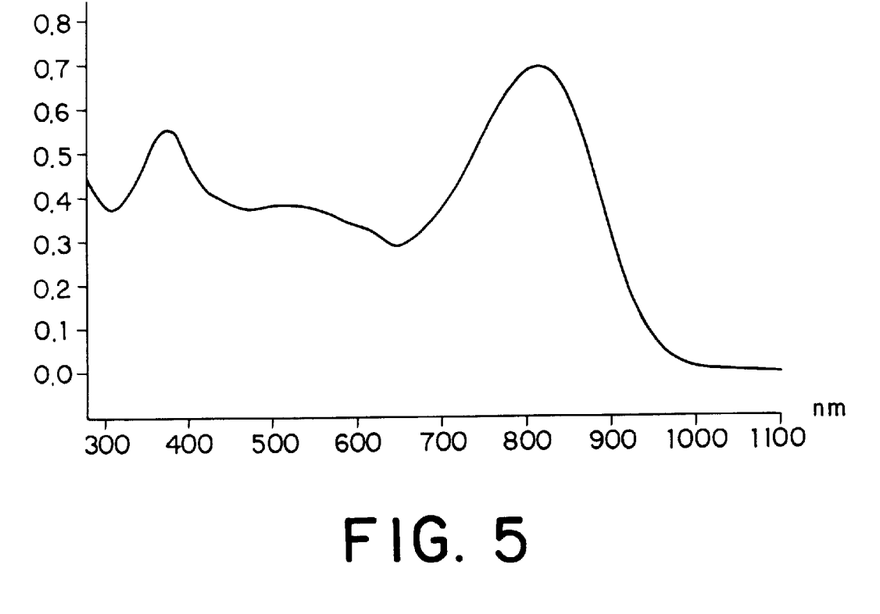
FIG. 5 is a graph showing an absorption curve of a disazo compound (5) of the present invention.

Similar phenomena are found in the following azo compounds. FIG. 4 and FIG. 5 show absorption curves of light of Disazo Compounds (4) and (5):

tized. Then, the diazotized compound is subjected to coupling respectively with 1-(N,N-dimethylamino)naphthalene in acidity in the case of Disazo Compound (1), with β-naphthol in the case of Disazo Compound (2) and α-naphthol in the case of Disazo Compound (3) respectively in alkalinity.

It is confirmed that the physical constants of the above described Disazo Compound (3) are shown as those of a compound having Structural Formula (III) in Table 1 in the following Examples and the physical constants of Disazo Compound (5) are a melting point of 278.0–281.3° C., a λ m (DMF) of 830 nm and a molar absorption coefficient of $3.12 \times 10^4$.

Of the polyazo compounds of the present invention, compounds represented by the following Structural Formulas (III), (V), (XXVI), etc., which can easily be prepared and have higher molar absorption coefficients, are preferably used.

Disazo compounds wh;ich can be used in the present invention can broadly be chosen, that is, from substituted or nonsubstituted aromatic monocyclic or polycyclic compounds, having at least one diazotizable primary amino group, which may have heterocyclic or alicyclic groups. Typical examples of the primary amine include anilines, naphthylamines, benzidines, 4,4'-diaminostilbenes, 2-aminobenzothiazoles (or oxazoles or imidazoles), (4)

(5)

As apparent from their absorption curves, in the case of Disazo Compound (4), a stronger absorption is found at the visible part (400 to 700 nm), but no absorption is found at the near-infrared part (700 to 1000 nm) in FIG. 4. On the other hand, in the absortion curve of Disazo Compound (5), absorption at the visible part substantially disappears, while a stronger absorption is instead found at the near-infrared part in FIG. 5.

It will clearly be understood that these differences are caused by —OH group present at p-position to the azo group in Disazo Compounds (3) and (5) and this phenomenon is first found by the inventors.

For example, Disazo Compounds (1), (2) and (3) can readily be prepared by the following procedures. That is, 4-nitroaniline is diazotized in conventional manner, coupled with 3-amino-4-methoxyacetanilide in acidity and the amino group of the resulting monoazo compound is further diazoaminoanthraqllinones, aminocoumarins or derivatives thereof. Typical examples of the other substituent than the diazotizable primary amino group include halogen atoms, non-substituted or substituted alkyl groups, non-substituted or substituted alkenyl groups, non-substituted or substituted alkoxyl groups, non-substituted or substituted phenoxy groups, acetylamino group, mono- or dialkyl-substituted amino groups, mono- or dihydroxyalkyl-substituted amino groups, non-substituted or substituted phenylamino groups, nitro group, cyano group, carboxyl group, carboxyamide group, sulfonic acid group, sulfonyl amide and the like. One or more or different combinations of these groups can simultaneously be incorporated.

Typical examples of the above described compounds are shown in the following, in which other primary amines than used in Examples are given.

Typical examples of the compound having a diazotizable primary amino group other than used in Examples are as follows:

The first azo component to be coupled with the above described diazo component can be selected in a broader range. However, these azo components should be chosen from those having a primary amino group or a substituent capable of being converted into a primary amino group, which can be coupled with a diazo component and can further be diazotized.

In the similar manner, the diazo component can be coupled with second and third azo components capable of satisfying the above described conditions to form disazo, trisazo and tetrakis azo compounds, but it is required for the final azo component to select in such a manner that —OH group or a group derived from —OH groupbe present at p-position to the azo group formed by coupling of the azo component.

Polyazo compounds synthesized so as to satisfy the above described conditions, each having strong absorption at near-infrared part, can be applied, as a near-infrared absorber, to optical recording media such as compact discs, laser discs, optical memory discs, optical cards, etc., liquid crystal display devices, optical letter reading devices, near-infrared ray absorbing filters, light-heat converting agents such as thermosensible transfer materials, heat sensitive papers, thermal plate punching materials, photoconductive materials, heat ray shielding agents for cars and building materials, and the like.

EXAMPLES

The present invention will now be illustrated in detail by the following Examples and Reference Examples without limiting the same.

λ max (DMF) shown in Examples respectively shows a peak wavelength of an absorption curve and DMF is a solvent (dimethylformamide) used for the measurement. ε is a molecular extinction coefficient (molar absorption coefficient) representing an absorbance per molar concentration, i.e. index of absorption capacity, measured by the use of, as a measuring device of extinction coefficient, a self-recording spectro photometer (HITACHI V-2010 type —commercial name—).

Example 1

Synthesis of:

① Diazotization of 4-nitroaniline and coupling thereof with 1-naphthylamine 4.1 g (0.03 mol) of 4-nitroaniline was added to a mixed solution of 12 ml of 35% hydrochloric acid and 100 ml of water, heated and dissolved and cooled to a temperature of 5 to 10° C. 2.3 g (0.033 mol) of sodium nitrite was dissolved in a small amount of water while stirring and maintaining the mixture at the above described temperature, gradually added thereto and stirred for about 3 hours at the same temperature, and the residual sodium nitrite was removed with sulfamic acid, thus obtaining a diazotized solution of 4-nitroaniline.

On the other hand, 4.7 g (0.033 mol) of 1-naphthylamine was dissolved in 20 ml of DMSO (dimthyl sulfoxide), to which the above described diazotized solution was added while maintaining at a temperature of 5 to 10° C. and a pH at 3 to 4 with sodium acetate, and the coupling reaction was effected for about 3 hours. Then, using soda ash to adjust pH to weak alkalinity, the mixture was heated to 80° C. and allowed to stand for cooling. The thus resulting monoazo compound was filtered, washed with water and dried. Product 8.6 g, yield 98%.

② Diazotization of:

and coupling with 1-naphthol 2.0 g (0.0068 mol) of the above described mono azo compound obtained in ① was dissolved in 250 ml of DMSO, to which 15 ml of 35% hydrochloric acid was added and an equivalent amount of sodium nitrite dissolved in a small amount of water was added with agitation at a temperature of 15 to 20° C., and diazotization was thus carried out at the above described temperature for about 5 hours.

On the other hand, 1.1 g (0.0076 mol) of 1-naphthol was dissolved in 200 ml of water with equivalent of sodium hydroxide, to which 12 g of soda ash was added and the above described diazotized solution was dropwise added with stirring at 5 to 10° C. The whole mixture was maintained in slight alkalinity, stirred at 15 to 20° C. for about 5 hours and heated to 80° C. to complete the coupling reaction. After the mixture was then allowed to stand for cooling, the solid content being filtered, and washed with water, it was further washed with a small amount of ethanol and dried, thus obtaining 2.3 g of a black and violet powdered disazo compound represented by the foregoing formula.

This compound had properties of MP: 239 to 243.2, $\lambda$ max (DMF): 839 nm, and $\epsilon$:6.31×10$^4$, exhibited strong absorption at near-infrared part and could be used as a near infrared ray absorber.

When a similar reaction was carried out using equivalent of 4-anisidine instead of 4-nitroaniline in this Example, there was obtained a disazo compound represented by the following formula, having properties of MP: 123.1 to 126.2° C., $\lambda$ max (DMF): 704 nm and $\epsilon$: 2.77×10$^4$. This compound could also be used as a near-infrared ray absorbing agent.

Example 2

Synthesis of:

① Diazotization of aniline and coupling with 3-amino-4-methoxyacetanilide 4.7 g (0.05 mol) of aniline was diazotized in conventional manner in acidity. On the other hand, 9.0 g (0.05 mol) of 3-amino-4-methoxyacetanilide was dissolved in 20 ml of 35% hydrochloric acid and 200 ml of water, to which a diazotized solution of aniline was then added with stirring at a temperature of 5 to 10° C. During the same time, the reaction solution was maintained at a pH of 3 to 4 with sodium acetate and subjected to coupling reaction at the above described temperature for about 3 hours. The reaction solution was maintained in a pH of slight alkalinity with soda ash and heated at 80° C., to complete the reaction. The product was allowed to stand for cooling and the resulting mono azo compound was filtered, washed with water and dried.

② Diazotization of:

and coupling reaction with 1-naphthaol

2.8 g (about 0.01 mol) of the above described mono azo compound obtained in ① was dissolved in 250 ml of DMSO, to which 15 ml of 35% hydrochloric acid was added and an equivalent amount of sodium nitrite dissolved in a small amount of water was added with agitation at a temperature of 15 to 20° C., and diazotization was thus carried out at the above described temperature for about 5 hours.

On the other hand, 1.6 g (0.011 mol) of 1-naphthol was dissolved in 200 ml of water with equivalent of sodium hydroxide, to which 10 g of soda ash was added and the above described diazotized solution was dropwise added with stirring at 5 to 10° C. The whole mixture was maintained in slight alkalinity, stirred at 15 to 20° C. for about 5 hours and heated to 80° C. to complete the coupling reaction. After the mixture was then allowed to stand for cooling, the solid content being filtered, and washed with water, it was further washed with a small amount of ethanol and dried, thus obtaining a powdered disazo compound represented by the foregoing formula, having properties of MP: 119.5 to 122.3, λ max (DMF): 713 nm and ε: 2.23×10⁴.

Example 3

Synthesis of:

① Diazotization of:

and coupling thereof with 1-naphthylamine 2.06 g (0.01 mol) of 2-trifluoromethyl-4-nitroaniline was dissolved in 20 ml of concentrated nitric acid, to which 3.5 g (0.011 mol) of 40 % nitrosyl-nitric acid was added at 0 to 5° C., and the mixture was gradually heated and stirred at 15 to 20° C. for about 3 hours to effect the diazotization. On the other hand, 1.58 g (0.011 mol) of 1-naphthylamine was dispersed in 300 ml of water, to which 3 g of sulfamic acid was added and the above described diazotized solution was dropwise added while stirring at a temperature of 0 to 5° C. During the same time, the reaction mixture was maintained at a pH of 3 to 4 with sodium acetate, gradually heated and stirred at room temperature for about 3 hours. Then, the mixture was neutralized with sodium hydroxide to a pH of 7 to 8 and heated to 80° C. to complete the coupling reaction. The thus resulting monoozo compound was filtered, washed adequately with water and dried. Yield 3.4 g (yield 94.4%), MP 238.2 to 241.5° C.

② Diazotization of:

and coupling with 1-naphthol 4.3 g (0.012 mol) of the above described mono azo compound obtained in ① was dissolved in 150 ml of DMSO, to which 20 ml of 35% concentrated hydrochloric acid was added to form the hydrochloride and 1.4 g of sodium nitrite dissolved in 20 ml of water was dropwise added with stirring at 15 to 20° C. Diazotizing reaction was thus carried out at the same temperature for about 3 hours and the exccessive nitrite was then removed with sulfamic acid.

On the other hand, 2.0 g (0.014 mol) of 1-naphthol was dissolved in 200 ml of water with a small amount of sodium hydroxide, to which 20 g of soda ash was added and the above described diazotized solution was dropwise added with stirring at 5 to 10° C. The mixture was gradually heated, stirred at room temperature for about 5 hours, heated to 90° C. and then allowed to stand for cooling. The solid content was filtered, washed with water, further washed with ethanol and dried.

The thus obtained powder was a near-infrared ray absorbing disazo compound represented by the foregoing formula had properties of MP: 186.1 to 189.2° C., λ max (DMF): 863 nm, and ε: 3.54×10⁴.

In this Example ②, before the coupling reaction with 1-naphthol, the mono azo compound was again coupled with 1-naphthylamine under acidic condition and the resulting disazo compound was subjected to further diazotization of the terminal amino group and then coupling with 1-naphthol under alkaline condition to thus obtain a trisazo compound represented by the following formula and having strong absorption for a light at near-infrared part.

Example 4

① Tetrazotization of 3-(4'-aminophenyl)-7-aminocoumarin and coupling with 3-amino-4-methoxyacetanilide 5.0 g of 3-(4'-aminophenyl)-7-aminocoumarin was dissolved in 100 ml of DMSO, to which 4.0 g of sodium nitrite dissolved in 20 ml of water was added, and the mixed solution was added to a solution consisting of 20 ml of 35% hydrochloric acid and 100 ml of water at 15 to 20° C. and stirred for 6 hours at the same temperature to effect the tetrazotizing reaction, followed by removing exccessive nitrite with sulfamic acid.

On the other hand, 7.6 g of 3-amino-4-methoxyacetanilide was dissolved in 100 ml of DMS0 and stirred at 15 to 20° C., to which the above described tetrazotized solution was then added, followed by reacting at the same temperature for 5 hours. During the same time, the reaction mixture was maintained at a pH of 3 to 4 with sodium acetate. The reaction solution was then maintained in a weak alkalinity of pH about 8 to 9 with soda ash and gradually heated to 80° C. to complete the coupling reaction. The product was allowed to stand for cooling and the resulting disazo compound was filtered, washed successively with water and ethanol and dried. Yield 12.0 g (94.5%).

② Tetrazotization of disazo compound obtained in ① and coupling with 1-naphthol

1.27 g of the disazo compound obtained in ① was dissolved in 200 ml of DMSO, to which 20 ml of 35% hydrochloric acid was added to form the hydrochloride and 0.6 g of sodium nitrite dissolved in 5 ml of water was dropwise added with stirring at 15 to 20° C. to effect tetrazotization.

On the other hand, 0.63 g of 1-naphthol was dissolved in 150 ml of water with a small amount of sodium hydroxide, to which the above described tetra-azotized solution was dropwise added at a temperature of at most 10° C. The mixture was stirred at room temperature for about 6 hours, then heated to 80° C. and then allowed to stand for cooling. The thus obtained solid content was filtered, washed with water, further washed with ethanol and dried.

The thus obtained thick violet powder [1.55 g (82.0%)] was a tetrakisazo compound represented by the foregoing formula had properties of MP: 261 to 264.2° C., λ max (DMF): 803 nm, and E 371×10$^4$.

Example 5

Synthesis of:

①Tetrazotization of 4,4'-diaminostilbene-2,2'-disulfonic acid and coupling with 3-amino-4-methoxyacetanilide 3.7 g of 4,4'-diaminostilbene-2,2'-disulfonic acid (DAS) was dispersed in 100 ml of water and dissolved therein by rendering slightly alkaline with soda ash, to which 1.5 g of sodium nitrite dissolved in a small of water was added. On the other hand, 10 ml of 35 % hydrochloric acid was dissolved in 100 ml of water and stirred at 5 to 10° C., to which the above described mixed solution of DAS and sodium nitrite was dropwise added. The tetrazotizing reaction was then carried out at the same temperature for about 3 hours and exccessive nitrite was removed with sulfamic acid.

3.8 g of 3-amino-4-methoxyacetanilide was dissolved in 20 ml of DMSO and stirred at 5 to 10° C., to which the above described tetrazotized solution was then dropwise added. During the same time, the reaction mixture was maintained at a pH of 3 to 4 with sodium acetate and maintained at the above described temperature for about 5 hours. Then, the mixture was treated with sodium hydroxide to convert pH into 7 to 8, heated to 80° C. to complete the coupling reaction and then subjected to salting out with 5% of NaCl, based on the whole weight, to precipitate an object, which was then filtered at room temperature and dried.

② Tetrazotization of disazo compound obtained in ① and coupling with 1-naphthol 3.4 g of the disazo compound obtained in ① was dissolved in 100 ml of water with soda ash to give slight alkalinity, to which 0.7 g of sodium nitrite dissolved in a small amount of water was further added. On the other hand, a solution consisting of 5 ml of 35% hydrochloric acid and 100 ml of water was stirred at 5 to 10° C., to which the above described mixed solution of disazo compound and sodium nitrite was dropwise added. The mixture was then stirred at about 10° C. for about 3 hours to complete the tetrazotization of the disazo compound and the exccessive nitrite was removed with sulfamic acid.

1.5 g of 1-naphthol was dissolved in 100 ml of water with sodium hydroxide to be slightly alkaline, to which 5 g of soda ash was further added. To this mixture was dropwise added the above described tetrazotized solution with stirring at a temperature of at most 10° C. The mixture was further stirred at room temperature for several hours, and then heated to 80° C. to complete the coupling reaction. The mixture was then subjected to salting out with 5% of NaCl, based on the whole weight, and after allowing to stand for cooling, a precipitated thick violet solid was filtered and dried to obtain 3.8 g of a powder.

The thus obtained tetrakisazo compound was a water soluble near-infrared ray absorbing compound of λ max (DMF): 749 nm and ε: 2.42×10$^4$.

Example 6

Synthesis of:

4.8 g of the disazo compound represented by Formula (3) was dissolved in 300 ml of DMSO, to which 20 ml of 10% aqueous solution of sodium carbonate was added and with stirring at 100° C., 3.0 g of dimethylsulfuric acid was dropwise added. The mixture was further stirred at the same temperature for about 3 hours. After allowing to stand for cooling, the precipitated crystal was filtered, washed with water and then ethanol and dried to obtain a disazo compound represented by the above described formula.

The resulting disazo compound had near-infrared absorbing property and exhibited MP: 212.5 to 217.5° C. λ max (DMF): 831 nm and ε: 2.10×10$^4$.

In the similar manner, polyazo compounds shown in the following Table 1 are synthesized, which have strong absorption for lights of near-infrared part and thus can be applied to various uses as a near infrared ray absorber.

TABLE 1

| Structural Formula | Melting Point (°C.) | λ max (DMF) (nm) | Molar Absorption Coefficients (ε) |
|---|---|---|---|
| (I) | 217.0–220 | 777 | $3.27 \times 10^4$ |
| (II) | 220.1–223.4 | 726 | $0.56 \times 10^4$ |
| (III) | 241.5–247.1 | 830 | $5.28 \times 10^4$ |
| (IV) | 169.2–173.2 | 842 | $2.74 \times 10^4$ |
| (V) | 194.9–197 | 839 | $9.54 \times 10^4$ |
| (VI) | 227.8–232.2 | 868 | $1.01 \times 10^4$ |
| (VII) | at least 350 | 887 | $1.51 \times 10^4$ |
| (VIII) | at least 350 | 700 | $1.00 \times 10^4$ |
| (IX) | 189–192 | 825 | $1.57 \times 10^4$ |
| (X) | at least 350 | 719 | $4.19 \times 10^4$ |
| (XI) | 219.3–222.2 | 780 | $1.58 \times 10^4$ |
| (XII) | 203.6–207 | 725 | $2.48 \times 10^4$ |
| (XIII) | 124.8–127.3 | 743 | $0.69 \times 10^4$ |
| (XIV) | at least 350 | 864 | $1.63 \times 10^4$ |
| (XV) | at least 350 | 755 | $1.97 \times 10^4$ |
| (XVI) | at least 350 | 725 | $2.59 \times 10^4$ |

TABLE 1-continued

| Structural Formula | Melting Point (°C.) | λ max (DMF) (nm) | Molar Absorption Coefficients (ε) |
|---|---|---|---|
| (XVII) | 207.5–211.7 | 728 | $3.91 \times 10^4$ |
| (XVIII) | 262.3–266.1 | 745 | $1.94 \times 10^4$ |
| (XIX) | 207–215 | 811 | $2.31 \times 10^4$ |
| (XX) | at least 350 | 810 | $1.51 \times 10^4$ |
| (XXI) | 286.0–289.3 | 830 | $2.32 \times 10^4$ |
| (XXII) | 223.7–227.3 | 851 | $2.22 \times 10^4$ |
| (XXIII) | 228.3–232.1 | 751 | $4.05 \times 10^4$ |
| (XXIV) | at least 350 | 769 | $2.99 \times 10^4$ |
| (XXV) | 261–264.2 | 803 | $3.71 \times 10^4$ |
| (XXVI) | at least 350 | 755 | $4.67 \times 10^4$ |

Compounds of Structural Formula (I) to (XXVI) in the above described Table 1 can be represented by the following:

(I)

(II)

(III)

(IV)

-continued (V)

(VI)

(VII)

(VIII)

(IX)

(X)

(XI)

-continued (XII)

(XIII)

(XIV)

(XV)

(XVI)

(XVII)

(XVIII)

(XIX)

(XX)

(XXI)

(XXII)

(XXIII)

(XXIV)

(XXV)

(XXVI)

The near-infrared ray absorbing polyazo compound of the present invention, synthesized as described above, can be used by adding the same to various polymers, for example, acrylic resins such as polymethyl methacrylate, polystyrenes, polyesters, polycarbonates, polyamides, vinyl polymers such as polyvinyl chlorides, polyvinyl acetates, etc., or polyolefins such as polyethylene, polypropylene, etc., and forming in a suitable shape, for example, chips, plates, sheets, films, yarns, etc.

Reference Example 1

20 g of polymethyl methacrylate was dissolved in a mixed solvent consisting of 30 g of acetone, 30 g of toluene and 26.7 g of dimethylformamide (DMF), in which 0.2 g of the near-infrared ray absorbing disazo compound, obtained in Example 1, was dissolved, and the resulting solution was formed into a film of 0.05 mm thick by a casting method. The film was capable of allowing a light of visible part to permeate well and absorbing a light of near-infrared part in high efficiency. Thus, this film can be applied to various uses as a near-infrared ray cutting filter.

Reference Example 2

The near-infrared ray absorbing disazo compound of the present invention, obtained in Example 3, was dissolved in Methoxy Cellosolve to prepare a solution with a concentration of 6 % and coated onto a disc substrate of polyincarbonate, having a thickness of 1.2 mm, outer diameter of 120 mm and inner diamter of 15 mm, to give a film thickness of 120 nm. Gold was vapor deposited in vacuum to give a film thickness of 70 nm on the coated film and a resin of ultraviolet ray hardening type was furthe r coated thereon to obtain an overall protective coating film. The thus obtained optical recording medium had a good relectivity in the near-infrared zone as well as stable optical properties.

Advantages of the Present Invention

The present invention provides a polyazo compound capable of effectively absorbing near-infrared rays, which can readily be prepared using available raw materials. The polyazo compound of the present invention, having strong absorption at near-infrared part, can be applied, as a near-infrared absorber, to optical recording media such as compact discs, laser discs, optical memory discs, optical cards, etc., liquid crystal display devices, optical letter reading devices, photoconductive materials, near-infrared ray absorbing filters, light-heat converting agents such as thermosensible transfer materials, heat sensitive papers, thermal plate punching materials, heat ray shielding agents for cars and building materials, and the like.

What is claimed is:

1. A near-infrared ray absorbing polyazo compound comprising at least one —OH group or at least one group derived from —OH group, at p-position of an azo group, bonded to an aromatic polycyclic ring in the molecule of the polyazo compound and having an absorption maxima $\lambda_{max}$ measured in dimethylformamide falling within the range of from 700 to 1,000 nm.

2. A process for the production of a near-infrared ray absorbing polyazo compound comprising at least one —OH group or at least one group derived from —OH group, at p-position of an azo group, bonded to an aromatic polycyclic ring in the molecule of the polyazo compound, comprising diazotizing a substituted or nonsubstituted aromatic polycyclic compound having a diazotizable primary amino group, and successively coupling the resulting diazo component with an azo component having a diazotizable primary amino group, the last azo component being such that —OH group or a group derived from —OH group be present at p-position to an azo group bonded to an aromatic polycyclic ring resulting from the azo component.

3. A near-infrared ray absorbing polyazo compound having the formula: